United States Patent
Seo et al.

(10) Patent No.: US 11,526,494 B2
(45) Date of Patent: Dec. 13, 2022

(54) BLOCKCHAIN-BASED COMPUTING SYSTEM AND METHOD FOR MANAGING TRANSACTION THEREOF

(71) Applicant: SAMSUNG SDS CO., LTD., Seoul (KR)

(72) Inventors: Han Saem Seo, Seoul (KR); Chang Suk Yoon, Seoul (KR); Kyu Sang Lee, Seoul (KR); Jun Tae Kim, Seoul (KR); Sang Jun Kang, Seoul (KR); Young Woon Kwon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 212 days.

(21) Appl. No.: 16/725,083

(22) Filed: Dec. 23, 2019

(65) Prior Publication Data

US 2020/0379980 A1    Dec. 3, 2020

(30) Foreign Application Priority Data

Jun. 3, 2019  (KR) .......................... 10-2019-0065588

(51) Int. Cl.
*G06F 16/23* (2019.01)
*G06F 9/46* (2006.01)
*G06F 16/245* (2019.01)

(52) U.S. Cl.
CPC .......... *G06F 16/2379* (2019.01); *G06F 9/466* (2013.01); *G06F 16/245* (2019.01)

(58) Field of Classification Search
CPC .... G06F 16/2379; G06F 9/466; G06F 16/245; G06F 9/5038; G06F 16/2228; H04L 67/1097

See application file for complete search history.

(56) References Cited

U.S. PATENT DOCUMENTS 6,240,422 B1 * 5/2001 Atkins .................. H04M 15/00
                                                               715/764
10,846,096 B1 * 11/2020 Chung ................... G06N 20/00
(Continued)

FOREIGN PATENT DOCUMENTS

KR    10-2018-0014534 A    2/2018

OTHER PUBLICATIONS

Hyperledger Fabric, Hyperledger Fabric, May 31, 2018, GitHub, p. 1-436, downloaded from the Internet on Oct. 15, 2021, URL: https://github.com/hyperledger/fabric/tree/b769311601bd96d6f934e7de4e48168fb66b8bb6/docs/source (Year: 2018).*

(Continued)

*Primary Examiner* — Pierre M Vital
*Assistant Examiner* — Vy H Ho
(74) *Attorney, Agent, or Firm* — The PL Law Group, PLLC

(57) ABSTRACT

A method for managing transaction is performed in a blockchain-based computing system and includes receiving a request for processing a first individual transaction from a client terminal, generating a batch transaction by aggregating a plurality of individual transactions including the first individual transaction, processing the generated batch transaction via a blockchain network, such that a status record associated with the batch transaction is recorded in the blockchain, and providing the client terminal with an identifier of the batch transaction and index information on the first individual transaction, wherein the status record associated with the batch transaction includes a first status record associated with the first individual transaction, and wherein the index information on the first individual transaction is determined based on a location of the first status record in the status record.

11 Claims, 17 Drawing Sheets

(56) References Cited

U.S. PATENT DOCUMENTS

| | | | | |
|---|---|---|---|---|
| 2014/0101235 A1* | 4/2014 | Smedberg | ............... | H04L 67/01 |
| | | | | 709/203 |
| 2016/0028699 A1* | 1/2016 | Ambroz | ................ | H04L 9/3242 |
| | | | | 713/168 |
| 2017/0213209 A1* | 7/2017 | Dillenberger | ...... | G06Q 20/3829 |
| 2017/0278186 A1* | 9/2017 | Creighton, IV | ..... | G06Q 20/401 |
| 2020/0028947 A1* | 1/2020 | Yang | ..................... | H04L 9/3247 |

OTHER PUBLICATIONS

Ethereum, Ethereum, Feb. 12, 2018, GitHub, p. 1-760, downloaded from the Internet on Oct. 15, 2021, URL: https://github.com/Yuto-l/wiki (Year: 2018).*

Lisa Tagliaferri, An Introduction to JSON, Dec. 8, 2016, DigitalOcean, p. 1-14, downloaded from the Internet on Oct. 15, 2021 , URL: htttps://www.digitalocean.com/community/tutorials/an-introduction-to-json (Year: 2016).*

Ethereum/StackExchange, Grouping and queuing transactions, Nov. 15, 2017, StackExchange, p. 1-2, downloaded from the Internet on Oct. 16, 2021, URL: https://ethereum.stackexchange.com/questions/30831/grouping-and-queuing-transactions (Year: 2017).*

Timothy McCallum, Diving into Ethereum's world state, Feb. 11, 2018, Medium, p. 1-23, downloaded from the Internet on Oct. 15, 2021, URL:https://medium.com/cybermiles/diving-into-ethereums-world-state-c893102030ed (Year: 2018).*

Somtomas et al., Better way to represent array in java properties file, dated 2016, p. 1-6, downloaded from the Internet on Mar. 16, 2022, URL: https://stackoverflow.com/questions/7015491/better-way-to-represent-array-in-java-properties-file (Year: 2016).*

Sinha , "Batch: An API to bundle multiple RESToperations", dated Nov. 27, 2018, p. 1-9, downloaded from the Internet on Mar. 15, 2022, URL: https://medium.com/paypal-tech/batch-an-api-to-bundle-multiple-paypal-rest-operations-6af6006e002 (Year: 2018).*

* cited by examiner

BLOCKCHAIN-BASED COMPUTING SYSTEM AND METHOD FOR MANAGING TRANSACTION THEREOF

CROSS-REFERENCE TO RELATED APPLICATION

This application claims priority from Korean Patent Application No. 10-2019-0065588 filed on Jun. 3, 2019 in the Korean Intellectual Property Office, and all the benefits accruing therefrom under 35 U.S.C. 119, the contents of which in their entirety are herein incorporated by reference.

BACKGROUND

1. Technical Field

The present disclosure relates to a blockchain-based computing system and a method for managing transaction thereof. More specifically, it relates to a computing system performing accelerative processing for a blockchain transaction via batch processing and a method for managing a transaction being performed by the system.

2. Description of the Related Art

Blockchain is a data management technology or data structure itself that records continuously increasing data in a particular unit of block, and each blockchain node constituting a peer-to-peer (P2P) network manages the block as a chain-type data structure. Blockchain technology may ensure the integrity and security of transactions via a consensus process in which all blockchain nodes in a network record and verify transactions.

However, since the consensus process limits the processing power of the network to the processing power of a single node, it is also a major factor that degrades the transaction processing performance of blockchain-based computing systems. In other words, in the blockchain-based computing system, even if the number of blockchain nodes is increased, the performance improvement of the system cannot be guaranteed. Therefore, it is practically impossible to introduce the blockchain technology to a field requiring rapid processing of a large amount of transactions. Further, it is still a long way from the blockchain-based computing system to replace a legacy system.

In conclusion, in order to advance the practical use of the blockchain technology and expand the scope of application, it is urgently needed to solve performance issues of the blockchain-based computing system.

SUMMARY

Aspects of the present disclosure provide a blockchain-based computing system that performs accelerative processing on a blockchain transaction based on batch processing to improve transaction processing performance, and a method performed in the system.

Aspects of the present disclosure also provide a method for managing a transaction capable of solving a query problem that may be caused by batch processing, and a blockchain-based computing system performing the method.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the inventive concept, there is provided a method for managing a transaction. The method is performed in a blockchain-based computing system and comprises receiving a request for processing a first individual transaction from a client terminal, generating a batch transaction by aggregating a plurality of individual transactions including the first individual transaction, processing the generated batch transaction via a blockchain network, such that a status record associated with the batch transaction is recorded in the blockchain, and providing the client terminal with an identifier of the batch transaction and index information on the first individual transaction, wherein the status record associated with the batch transaction includes a first status record associated with the first individual transaction, and wherein the index information on the first individual transaction is determined based on a location of the first status record in the status record.

According to another aspect of the inventive concept, there is provided a method for managing a transaction. The method is performed in a blockchain-based computing system and comprises receiving a request for processing an first individual transaction along with a transaction code of the first individual transaction from a client terminal, generating a batch transaction by aggregating a plurality of individual transactions including the first individual transaction, processing the generated batch transaction via a blockchain network, such that a plurality of status records associated with the batch transaction are recorded in the blockchain, and providing the client terminal with an identifier of the batch transaction, wherein the plurality of status records includes a first status record associated with the first individual transaction, and wherein the first status record is recorded in the blockchain in an encrypted state by the transaction code.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present disclosure will be described in detail with reference to the accompanying drawings.

Figure 1:
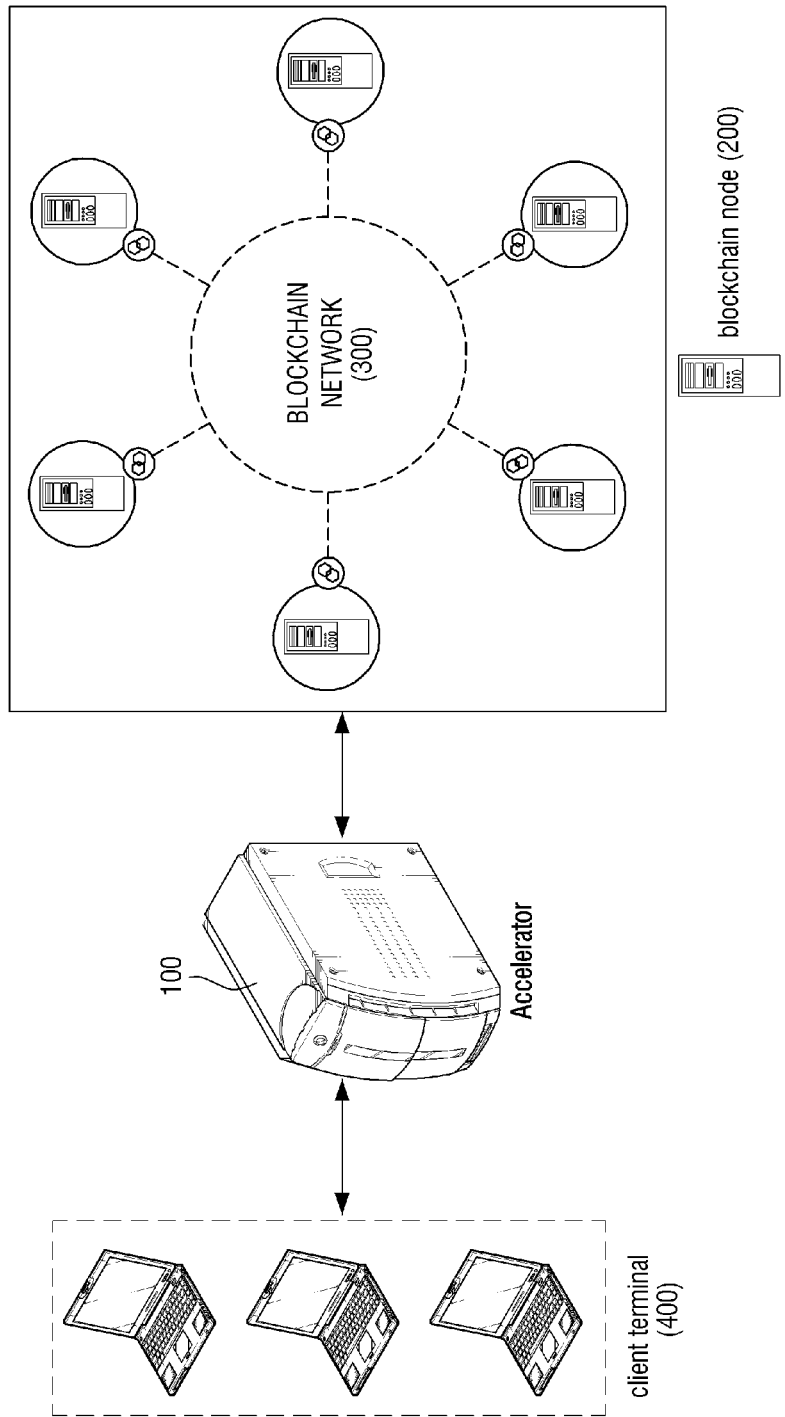
FIG. 1 is an exemplary configuration diagram illustrating a blockchain-based computing system according to some embodiments of the present disclosure.

FIG. 1 is an exemplary configuration diagram illustrating a blockchain-based computing system according to various embodiments of the present disclosure.

As shown in FIG. 1, the computing system may provide a transaction processing and management function to a client terminal 400 in cooperation with a blockchain network 300. In addition, the computing system may include a transaction accelerative processing device 100 and a plurality of blockchain nodes 200 constituting the blockchain network 300. However, this is only a preferred embodiment for achieving the object of the present disclosure. Naturally, some components may be added or deleted as necessary. For example, the computing system may include only the transaction accelerative processing device 100.

In addition, it is noted that each apparatus illustrated in FIG. 1 represents functionally distinct functional elements, and at least one device may be implemented to be integrated with each other in an actual physical environment. For example, the transaction accelerative processing device 100, the client terminal 400, and/or the blockchain node 200 may be implemented in the form of different logic within the same physical computing device. In other words, the transaction accelerative processing device 100 may operate as the blockchain node 200, and the transaction accelerative processing function (e.g., a batch processing function) may be implemented at the client terminal 400 side.

Hereinafter, a reference numeral "200" is used to mean an each arbitrary blockchain node, and when it distinguishes and refers to blockchain nodes, the alphabet (e.g., a, b, and c) shall be recorded together with the reference numeral "200." Similarly, a reference numeral "400" is used to mean any client terminal, and when it distinguishes and refers to client terminals, the alphabet (e.g., a, b, and c) shall be recorded together with the reference numeral "400." In addition, for convenience of description, the transaction accelerative processing device 100 will be abbreviated as an accelerator.

Figure 2:
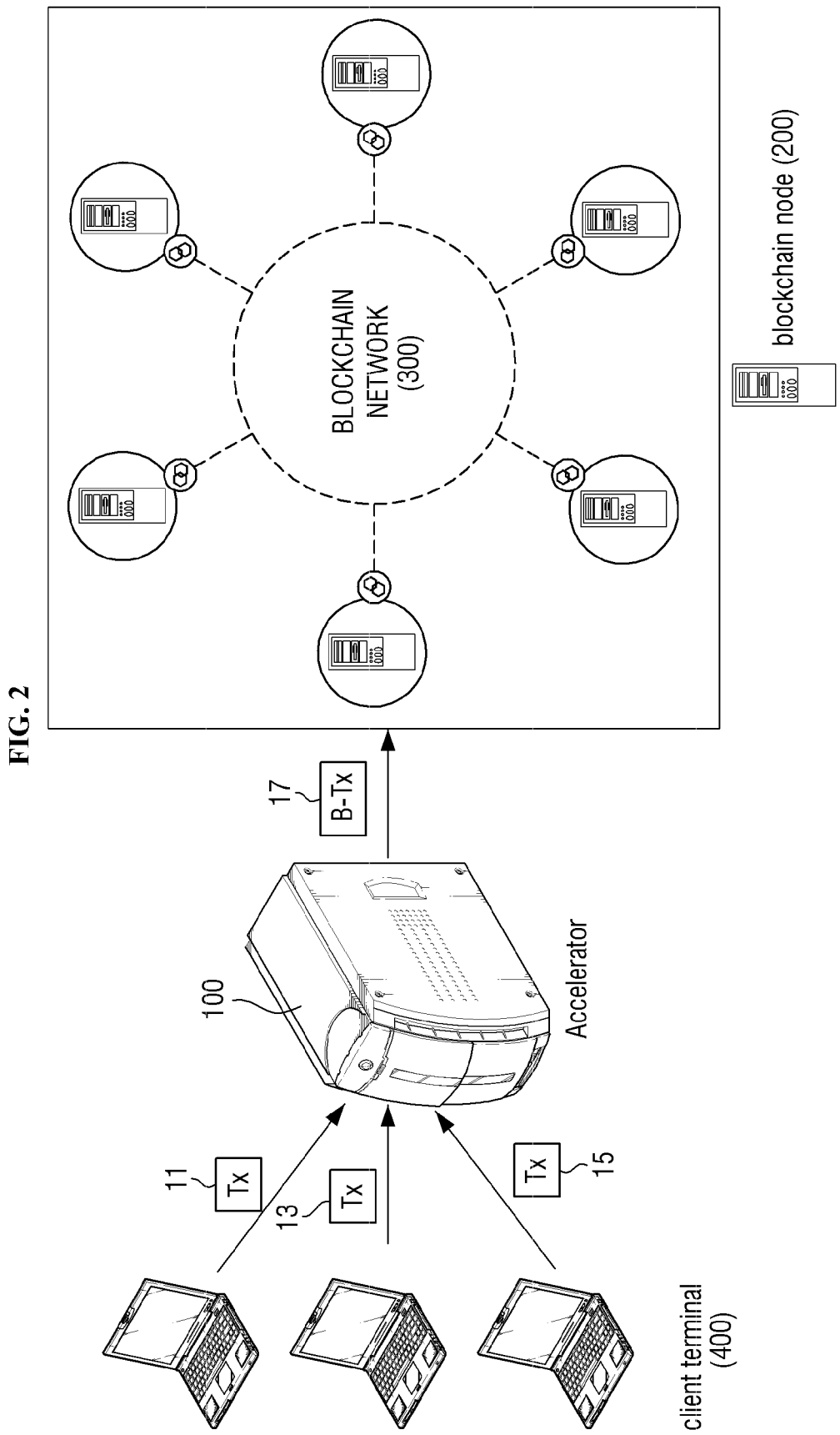
FIG. 2 is an exemplary diagram illustrating an operation of batch processing of an apparatus for accelerative processing a transaction according to some embodiments of the present disclosure.

In the computing system, an accelerator 100 is a computing device that performs accelerative processing for a transaction based on batch processing. For example, as shown in FIG. 2, the accelerator 100 may generate a batch transaction 17 by aggregating a plurality of individual transactions 11, 13, and 15 requested by the client terminal 400, and cooperate with the blockchain network 300 to batch process the batch transaction 17. Details of the batch processing will be described later with reference to FIGS. 4 to 6.

Figure 17:
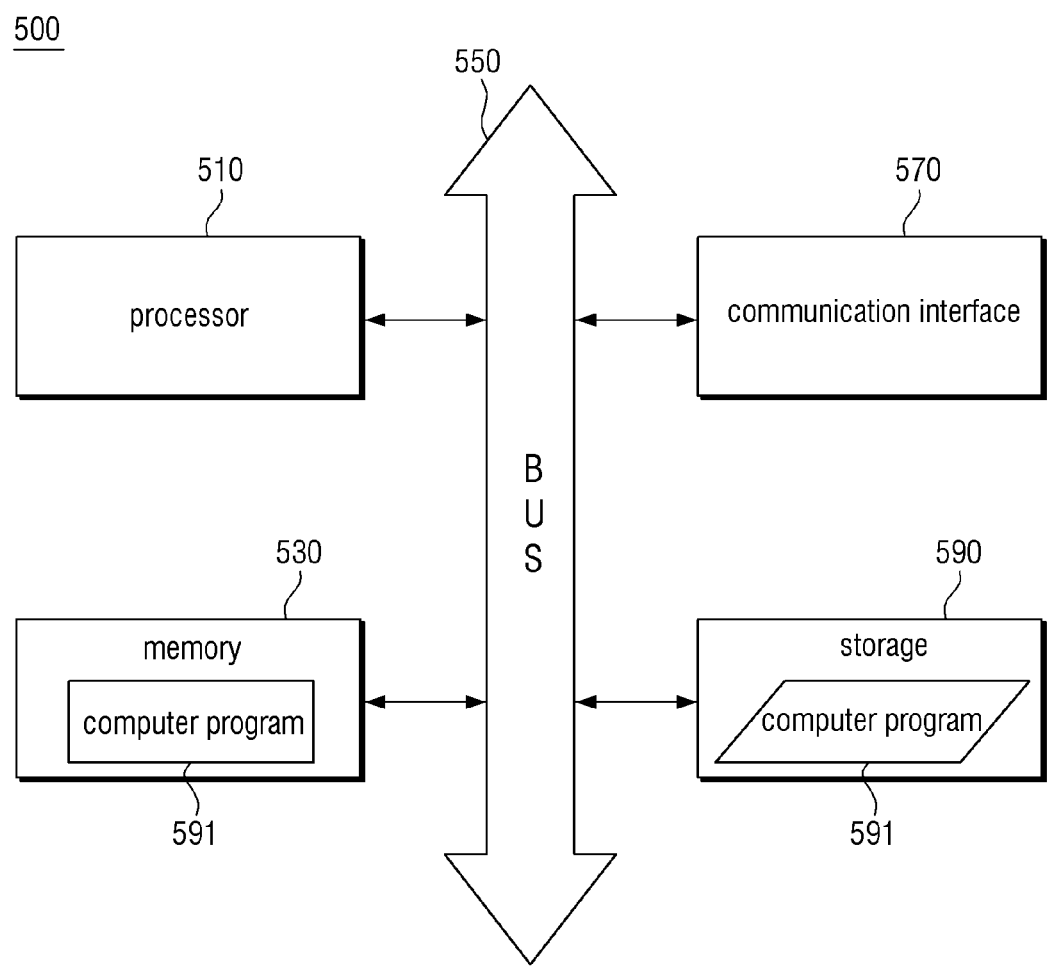
FIG. 17 illustrates an example computing device capable of implementing an apparatus/system according to various embodiments of the present disclosure.

The computing device may be a notebook, a desktop, a laptop, or the like, but are not limited thereto, and may include any kinds of devices equipped with a computing function and a communication function. However, in an environment in which a large amount of transaction processing is required, it may be desirable to implement the accelerator 100 as a high performance server-class computing device. Reference is made to FIG. 17 for an example of the computing device.

According to various embodiments of the present disclosure, the accelerator 100 may adjust a batch size based on monitoring information on a transaction failure event. The batch size may refer to a value or parameter for adjusting the number of individual transactions included in a batch transaction. A detailed description of this embodiment will be described later with reference to FIGS. 8 to 13.

A detailed description of the configuration and operation of the accelerator 100 will be described in detail with reference to FIG. 4 and the subsequent drawings.

FIG. 1 shows that one accelerator 100 is arranged as an example, but the number and arrangement of the accelerator 100 may be variously designed and selected according to an embodiment. In other words, in some other embodiments, a plurality of accelerators (e.g., 100a and 100b of FIG. 3) may be arranged. By doing so, the performance, stability, or availability of a system for processing a transaction may be further improved. Here, the cooperation between the accelerator 100 and the blockchain node 200 may be configured in various forms as in the following embodiments.

In some embodiments, each of the plurality of accelerators 100 is cooperated with all blockchain nodes 200, and a transaction requested by the client terminal 400 may be distributed and processed via the plurality of accelerators 100. In other words, the transaction requested by the client terminal 400 is distributed to any one of the accelerators 100, and the accelerator 100 processes the transaction in cooperation with the entire blockchain node 200.

Figure 3:
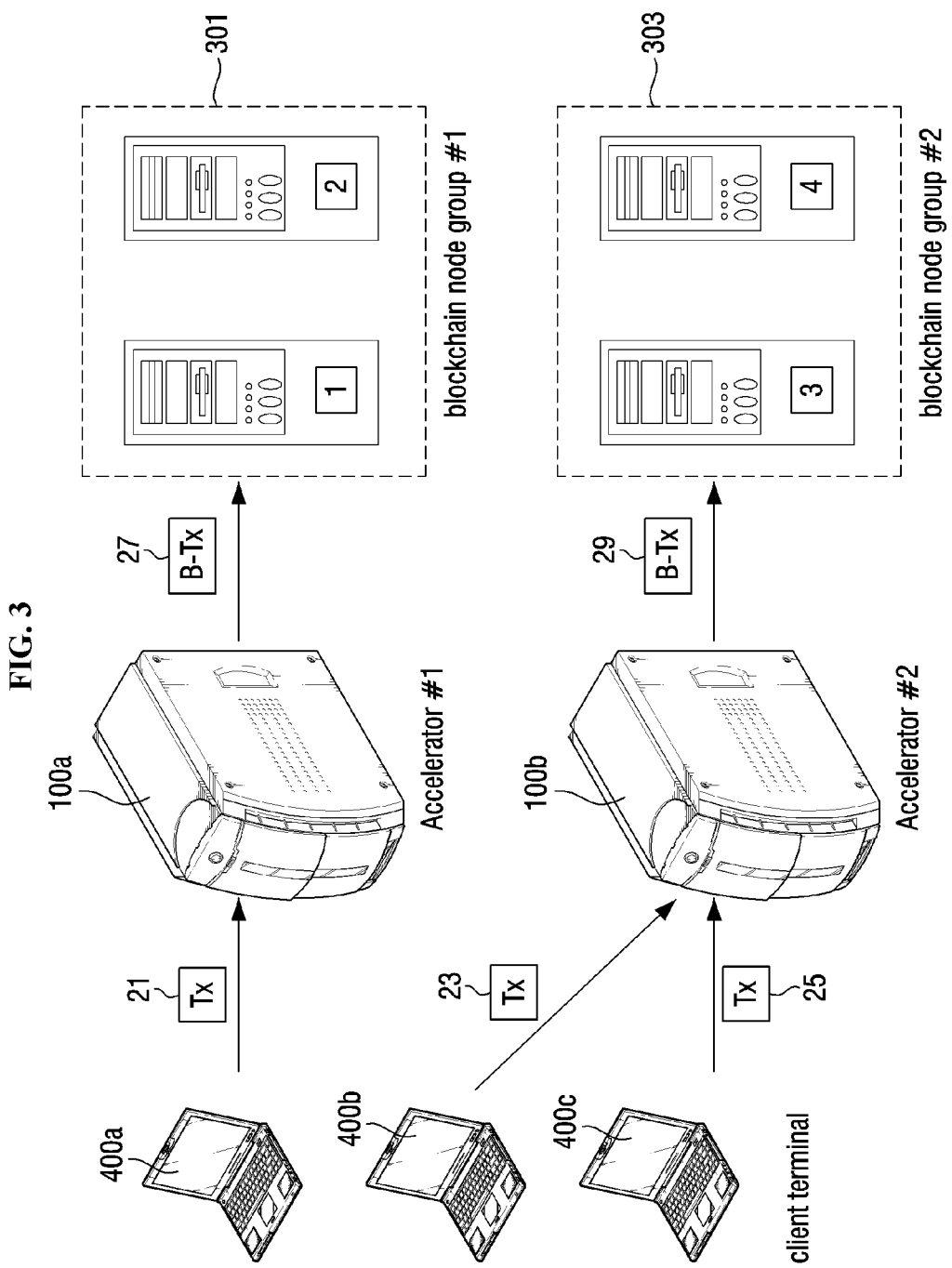
FIG. 3 is an exemplary diagram illustrating the cooperation between an apparatus for accelerative processing a transaction and a blockchain node according to some embodiments of the present disclosure.

In some other embodiments, as shown in FIG. 3, each of the plurality of accelerators 100*a* and 100*b* may be cooperated with some of the blockchain nodes 301 or 303. For example, a first accelerator 100*a* may be cooperated with a first blockchain node group 301, and a second accelerator 100*b* may be cooperated with a second blockchain node group 303. In this embodiment, the accelerators 100*a* and 100*b* cooperate with their own dedicated blockchain node groups 301 and 303, and process the requested transactions 21 to 25 in the batch form (e.g., 27 and 29). In some embodiments, the first blockchain node group 301 may correspond to a first channel of the blockchain network 300, and the second blockchain node group 303 may correspond to a second channel of the blockchain network 300. In other words, a dedicated accelerator (e.g., 100*a* and 100*b*) may be allocated to each channel of the blockchain network 300. Naturally, depending on embodiments, the dedicated accelerator 100 may be allocated to each blockchain node 200.

In some embodiments, particular devices (not shown) may provide a list of accelerators (e.g., 100*a* and 100*b* of FIG. 3) to the client terminal 400. The device (not shown) may provide load information on each accelerator (e.g., 100*a* and 100*b* of FIG. 3) together. The load information may include load information (e.g., CPU utilization) of the accelerators (e.g., 100*a* and 100*b* of FIG. 3) and load information on the block chain nodes (e.g., 301 and 303) cooperated with each accelerator (e.g., 100*a* and 100*b* of FIG. 3). In this embodiment, the client terminal 400 may select particular accelerators (e.g., 100*a* and 100*b* of FIG. 3) based on the list of the accelerators and the load information, and the requested transaction may be processed via the selected accelerator (e.g., 100*a* and 100*b* of FIG. 3). A function of the device (not shown) may be provided in the accelerator (e.g., 100*a* and 100*b* of FIG. 3), but the technical scope of the present disclosure is not limited thereto.

In the computing system, the blockchain node 200 is a node constituting the blockchain network 300 having the P2P structure and operating according to a blockchain protocol. Each blockchain node 200 may manage a ledger. In some embodiments, the ledger may include a blockchain in which transaction data are recorded and a status database in which status data (e.g., a status key and a corresponding status value) are stored. In addition, the transaction data may include a status record associated with the transaction. The blockchain node 200 may share various smart contracts and transaction data via the blockchain, and may guarantee the integrity and security of a transaction via a consensus process.

In various embodiments of the present disclosure, the blockchain node 200 may perform a batch consensus process for batch transactions. Specifically, the blockchain node 200 may perform a series of consensus processes including executing the smart contract for individual transactions included in a batch transaction, signing an execution result for the smart contract, recording the signature and execution result in a block, propagating it, or the like. A detailed process of the consensus process may vary depending on how the blockchain-based computing system is implemented. Therefore, the technical scope of the present disclosure is not limited to any form of consensus process.

In various embodiments of the present disclosure, the blockchain node 200 may distinguish execution results of batch transactions by individual transactions (or by status records) via smart contract-based processing, and use the distinguished execution results to update the ledger. A detailed description thereof will be described later with reference to FIGS. 5 to 7.

Figure 6:
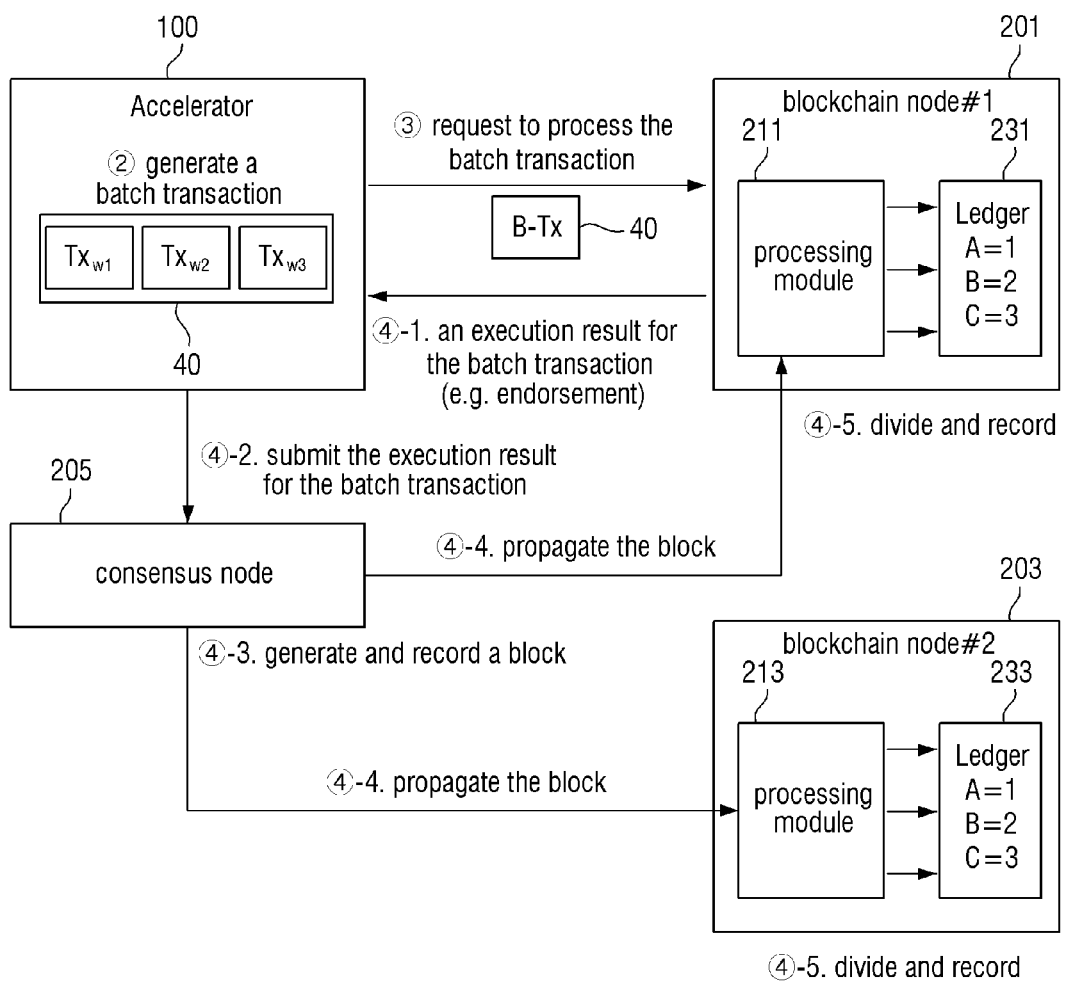

According to some embodiments of the present disclosure, the plurality of blockchain nodes 200 may be configured with different types of nodes. In addition, at least some of the different types of blockchain nodes may perform different operations. For example, a first type of blockchain node (e.g., an "endorsing peer" of Hyperledger Fabric) may execute the smart contract and sign on an execution result. A second type of blockchain node (e.g., an "orderer" of Hyperledger Fabric) may perform a main consensus process on the execution result for the smart contract, or perform an operation of recording the execution result in a block and propagating it. Hereinafter, the second type of blockchain node will be referred to as a "consensus node" to distinguish it from the first type of blockchain node. Reference is made to FIG. 6 for explaining a process for processing a transaction in an environment where a consensus node exists.

The client terminal 400 is a terminal that receives a service for processing a transaction. The client terminal 400 may generate a transaction, send the generated transaction to the accelerator 100 and/or the blockchain network 300, and be provided with a processing result for the transaction from the accelerator 100 and/or the blockchain network 300.

In various embodiments of the present disclosure, the client terminal 400, the accelerator 100, and the blockchain node 200 may communicate over a network. The network may be implemented as any type of wired/wireless network such as a local area network (LAN), a wide area network (WAN), a mobile radio communication network, a wireless broadband Internet (Wibro), or the like.

The system for processing the transaction based on the blockchain according to some embodiments of the present disclosure has been described with reference to FIGS. 1 to 3. Hereinafter, the configuration and batch processing function of the accelerator 100 according to some embodiments of the present disclosure will be described in detail with reference to FIGS. 4 to 6.

Figure 4:
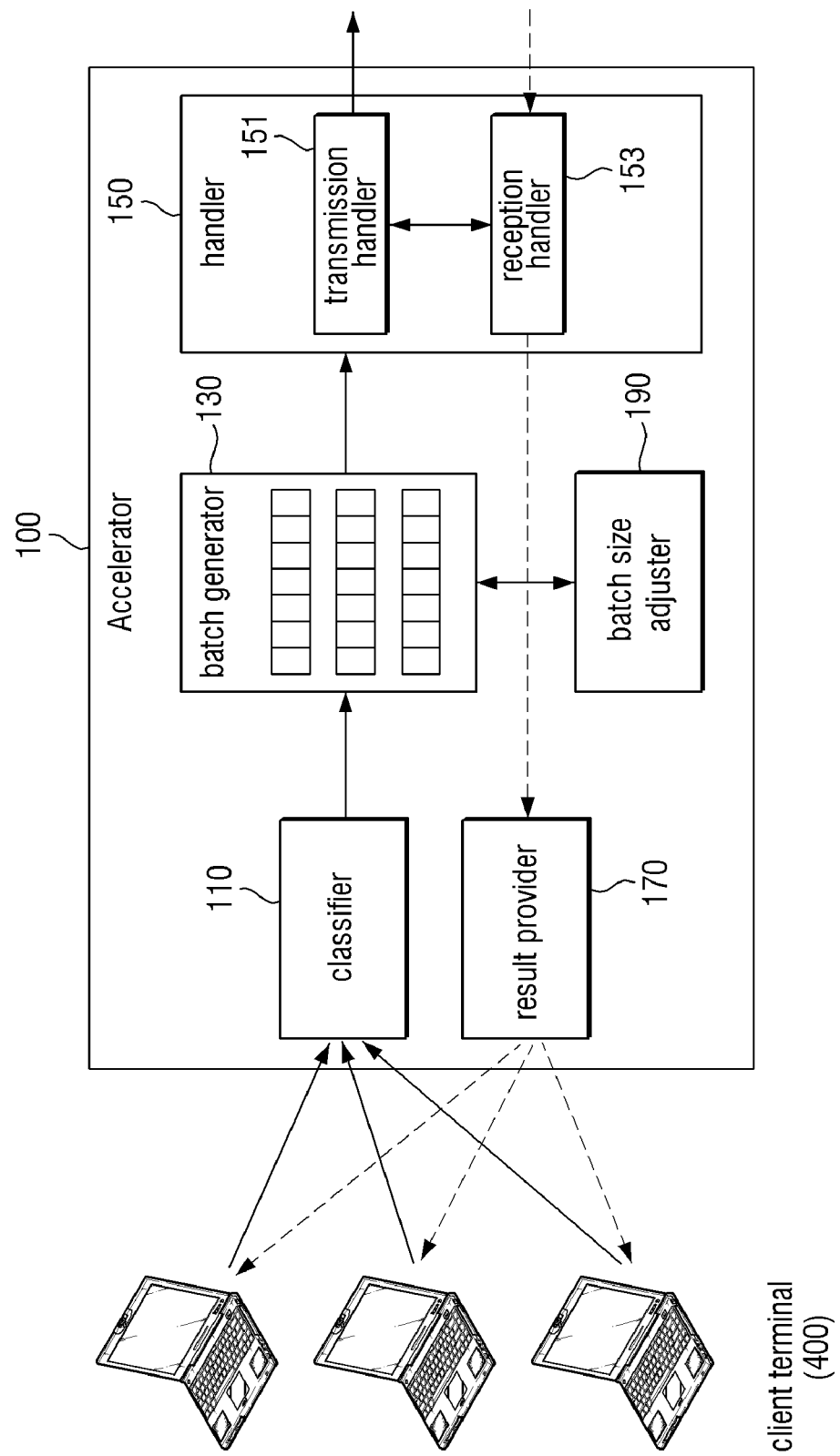
FIG. 4 is an exemplary block diagram illustrating an apparatus for accelerative processing a transaction according to some embodiments of the present disclosure.

FIG. 4 is an exemplary block diagram illustrating the accelerator 100 in accordance with some embodiments of the present disclosure.

As shown in FIG. 4, the accelerator 100 may include a classifier 110, a batch generator 130, a handler 150, a result provider 170, and a batch size adjuster 190. FIG. 4 only illustrates components related to an embodiment of the present disclosure. Therefore, it will be appreciated by those skilled in the art that it may further include other general purpose components in addition to the components illustrated in FIG. 4. In addition, each component of the accelerator 100 illustrated in FIG. 4 represents functionally divided functional elements, and may be implemented in a form in which at least one component is integrated with each other in an actual physical environment.

Looking into each component, the classifier 110 classifies individual transactions requested by the client terminal 400 according to predetermined classification criteria. Here, the predetermined classification criteria may include an identifier of a smart contract, a channel identifier, and/or a type of transaction, importance of a transaction, or the like, but is not limited thereto. The type of transaction may include a write type and a read type. However, the technical scope of the present disclosure is not limited thereto, and the type of transaction may be defined in various ways.

In more detail, the classifier 110 may classify each transaction by a channel, a smart contract, a type of transaction, and/or importance (e.g., classifying it into a write type transaction using a first smart contract of a first channel), and provide a classification result to the batch generator 130.

Next, the batch generator 130 generates a batch transaction by aggregating a plurality of individual transactions classified by the classifier 110. Specifically, the batch generator 130 inserts each classified individual transaction into a batch queue corresponding to the classification result. For example, the batch generator 130 may insert a first individual transaction classified as a first classification result into a first batch queue, and insert a second individual transaction classified as a second classification result into a second batch queue. Further, the batch generator 130 may generate a batch transaction by aggregating individual transactions included a particular batch queue in response to determining that the particular batch queue (e.g., the first batch queue or the second batch queue) satisfies a predetermined batch generation condition.

The batch queue refers to a place for storing a transaction until a batch transaction is generated, and may be understood as a kind of transaction buffer or a transaction pool. As may be seen from a name of a buffer queue, the batch queue may be implemented as a queue-based data structure. However, a scheme for implementing the batch queue may vary, and the technical scope of the present disclosure is not limited to the scheme for implementing the batch queue.

In various embodiments of the present disclosure, the predetermined batch generation condition may include at least one of a condition based on whether a batch timer expires, a batch size (i.e., the number of transactions), a data size of the entire transaction, presence or absence of association between transactions, or the like. Hereinafter, for convenience of understanding, a process for generating a batch transaction according to each batch generation condition will be described in detail.

In a first embodiment, the batch generator 130 may generate a batch transaction by aggregating individual transactions in a particular batch queue in response to an expiration event of a batch timer. Here, the batch timer may exist for each batch queue, but the scope of the present disclosure is not limited thereto. A timer period of each batch queue may be the same or may be different. For example, a timer period of a batch queue with a high priority may be set relatively short, and a timer period of a batch queue with a low priority may be set relatively long. Thus, a differential transaction processing service may be provided. According to this embodiment, a transaction waiting time due to the batch processing may be limited within a predetermined time (e.g., a batch timer period). Thus, a problem of delaying the processing of some individual transactions due to the batch processing may be alleviated.

In a second embodiment, the batch generator 130 may generate a batch transaction in response to determining that a data size of the entire transaction included in a particular batch queue is greater than or equal to a threshold value. Here, the data size of the entire transaction may be calculated as a sum of data sizes of the individual transactions, and the data sizes of the individual transactions may refer to, for example, a size of transaction data recorded in a blockchain. However, the technical scope of the present disclosure is not limited thereto. The threshold value may be a predetermined fixed value or a changeable variation value that varies depending on a situation. For example, the threshold value may be a fixed value set based on a maximum size of a block. For another example, the threshold value may be a fixed value or a variation value set based on a priority of a corresponding batch queue. As another example, the threshold value may be a variation value set to a larger value as a load of the batch generator 130 increases. According to the embodiment, it may be prevented that too much data is included in one batch transaction, thereby decreasing the probability of failing to process a batch transaction.

In a third embodiment, the batch generator 130 may generate a batch transaction in response to determining that the number of individual transactions included in a particular batch queue satisfies a batch size. Here, the batch size may be variably adjusted by the batch size adjuster 190.

]In a fourth embodiment, the batch generator 130 may generate a batch transaction based on an association between individual transactions. Specifically, the batch generator 130 determines whether there is an associated transaction of a particular transaction. Here, the associated transaction refers to a transaction in which an association exists with the particular transaction. For example, it may be a transaction (e.g., a transaction causing an MVCC conflict) including an identification key (i.e., a status key) of the same status record as the particular transaction. In other words, transactions that access the same status record as the particular transaction may be determined to be an associated transaction that has an association with the particular transaction. When it is determined that there is the associated transaction, the batch generator 130 may perform the batch processing in a variety of ways. Specific examples are as follows.

In a 4-1th embodiment, the batch generator 130 may generate and process a first individual transaction and a second individual transaction in which an association exists as different batch transactions.

In a 4-2th embodiment, the batch generator 130 may generate a batch transaction based on the remaining individual transactions except for the first transaction and the second transaction in which the association exists, and process the first individual transaction and the second individual transaction individually.

In a 4-3th embodiment, the batch generator 130 may process a first individual transaction in the batch form and process a second individual transaction individually, among the first individual transaction and the second individual transaction in which the association exists. In other words, the batch generator 130 may process some of a plurality of individual transactions in which an association exists in the batch form within a range in which a transaction conflict does not occur.

In a 4-4th embodiment, the batch generator 130 may determine whether a first individual transaction and a second individual transaction in which an association exists may be combined, and generate a third transaction in which the first individual transaction and the second individual transaction are combined in response to determining that they may be combined. Here, when an execution result for the third individual transaction is the same as a result for executing the first individual transaction and the second individual transaction, a method for generating the third individual transaction may be performed in any manner. In addition, the third individual transaction may be processed in the batch form, and may be processed individually.

According to the embodiments described above, the batch processing may be performed within a range in which a collision does not occur in consideration of an association between transactions. Accordingly, the problem that the stability of transaction processing is lowered may be alleviated. In the embodiments described above, for convenience of understanding, it has been described assuming that there is an association between two transactions, but those skilled in the art will readily understand that even if there is an association between three or more transactions, they may be processed in the same or similar manner.

In a fifth embodiment, the batch generator 130 may generate a batch transaction based on various combinations of the embodiments described above. For example, the batch generator 130 may generate a batch transaction further using a batch timer as well as a batch size. Specifically, the batch generator 100 may generate a batch transaction in response to determining that the number of transactions of a particular batch queue is greater than or equal to the batch size. In addition, even when the number of transactions of the particular batch queue is less than the batch size, the batch generator 130 may generate a batch transaction in response to an expiration event of the batch timer. By doing so, the transaction processing performance may be improved while minimizing a processing delay due to the batch processing.

Next, the handler 50 batch processes an individual transaction or a batch transaction in cooperation with the blockchain network 300. The handler module 150 may include a transmission handler 151 and a reception handler 153.

The transmission handler 151 performs an overall transmission process for data such as a batch transaction. Specifically, the transmission handler 151 may transfer the generated batch transaction to the blockchain network 300 in response to the batch transaction being generated. In addition, the transmission handler 151 may further perform operations such as sending an execution result (e.g., endorsement result) of the batch transaction signed by a blockchain node to a consensus node, retrying the batch transaction that has been failed to process, or the like.

The reception handler 153 performs an overall process for data received from the blockchain network 300, such as a processing result for a batch transaction. Specifically, the reception handler 153 provides the processing result to the result provider 170 in response to receiving a processing result for an individual transaction or a batch transaction. In addition, the reception handler 153 may further perform operations such as receiving a processing result for the signed batch transaction from the blockchain network 300 and transferring it to the transmission handler 151.

Figure 5:
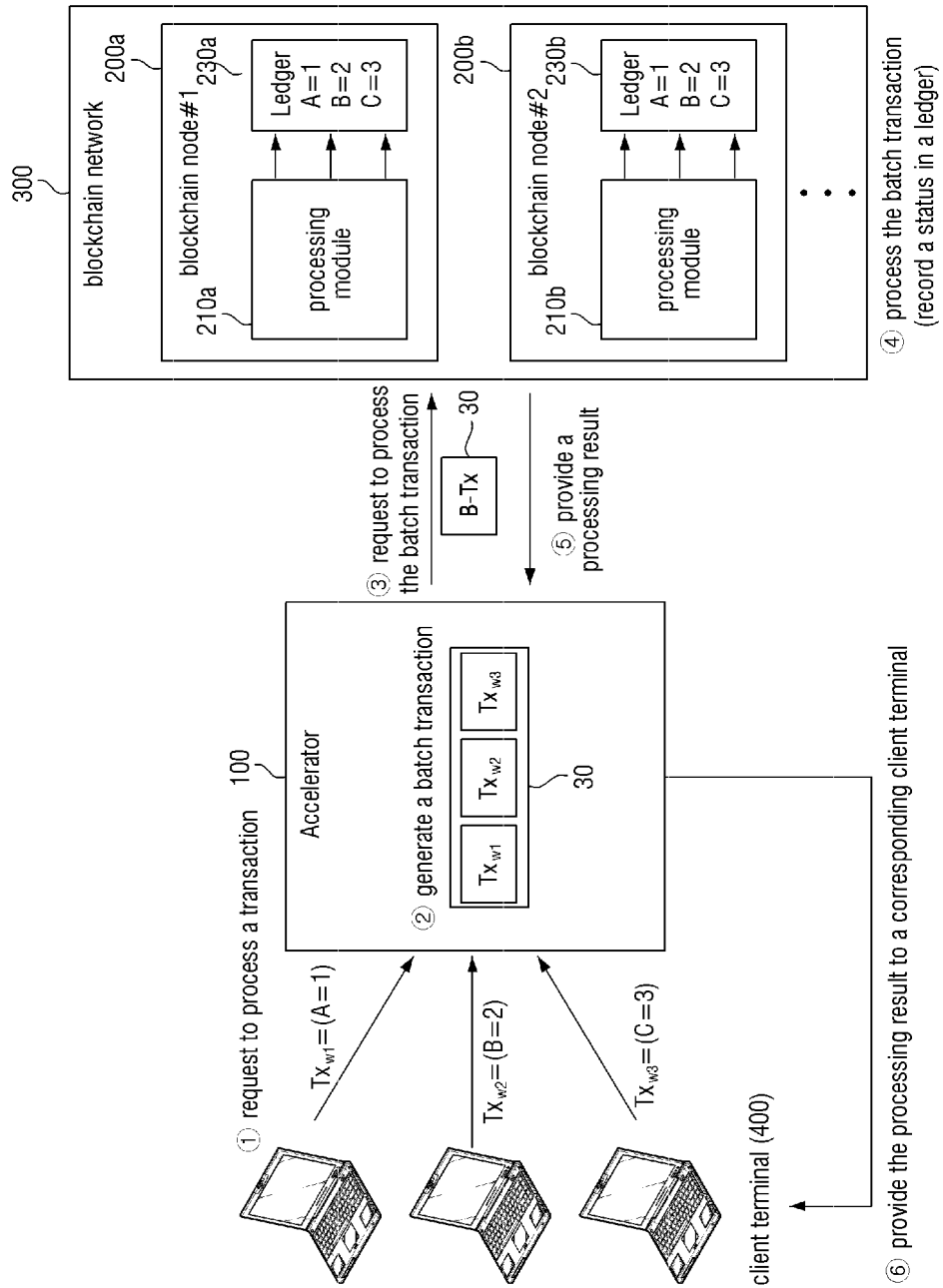
FIGS. 5 and 6 are exemplary diagrams illustrating a process for processing a write type transaction according to some embodiments of the present disclosure.

For further description of the handler 150, refer to the description of FIGS. 5 to 6.

Next, the result provider 170 receives the processing result for the individual transaction or the batch transaction from the reception handler 153, and provides the processing result to the client terminal 400. More specifically, the result provider 170 may divide the processing result for the batch transaction into individual transaction units, and provide the divided processing result to each client terminal 400. For example, the result provider 170 may generate a reference table including an identifier of the client terminal 400, a transaction identifier, an address of the client terminal 400, or the like, and provide the processing result for the individual transaction to the corresponding client terminal 400 using the reference table. However, the technical scope of the present disclosure is not limited thereto.

Next, the batch size adjuster 190 adjusts a batch size based on whether the blockchain network 300 is in a congested state. In addition, the batch size adjuster 190 may activate or deactivate a batch processing function. Here, deactivation of the batch processing function may be performed by setting the batch size to "1," but it may be done in any other way.

For example, the accelerator 100 may increase the batch size or activate the batch processing function in response to determining that the blockchain network 300 is in the congested state. In the opposite case, the batch size adjuster 190 may reduce the batch size or deactivate the batch processing function.

Each component 110 to 190 illustrated in FIG. 4 may refer to software or hardware such as a field programmable gate array (FPGA) or an application-specific integrated circuit (ASIC). However, the components are not limited to software or hardware, and may be configured to be in an addressable storage medium, or may be configured to execute one or more processors. Functions provided in the components may be implemented by more subdivided components, or may be implemented as one component that performs a specific function by combining a plurality of components.

Meanwhile, according to some embodiments of the present disclosure, the batch processing function of the accelerator 100 may be implemented on the client terminal 400 side. For example, when a particular client terminal 400 generates a plurality of individual transactions, a batch transaction may be generated by aggregating the plurality of individual blockchain transactions directly. As another example, when the particular client terminal 400 receives a plurality of individual transactions from another client terminal, a batch transaction may be generated by aggregating the plurality of individual transactions.

Figure 7:
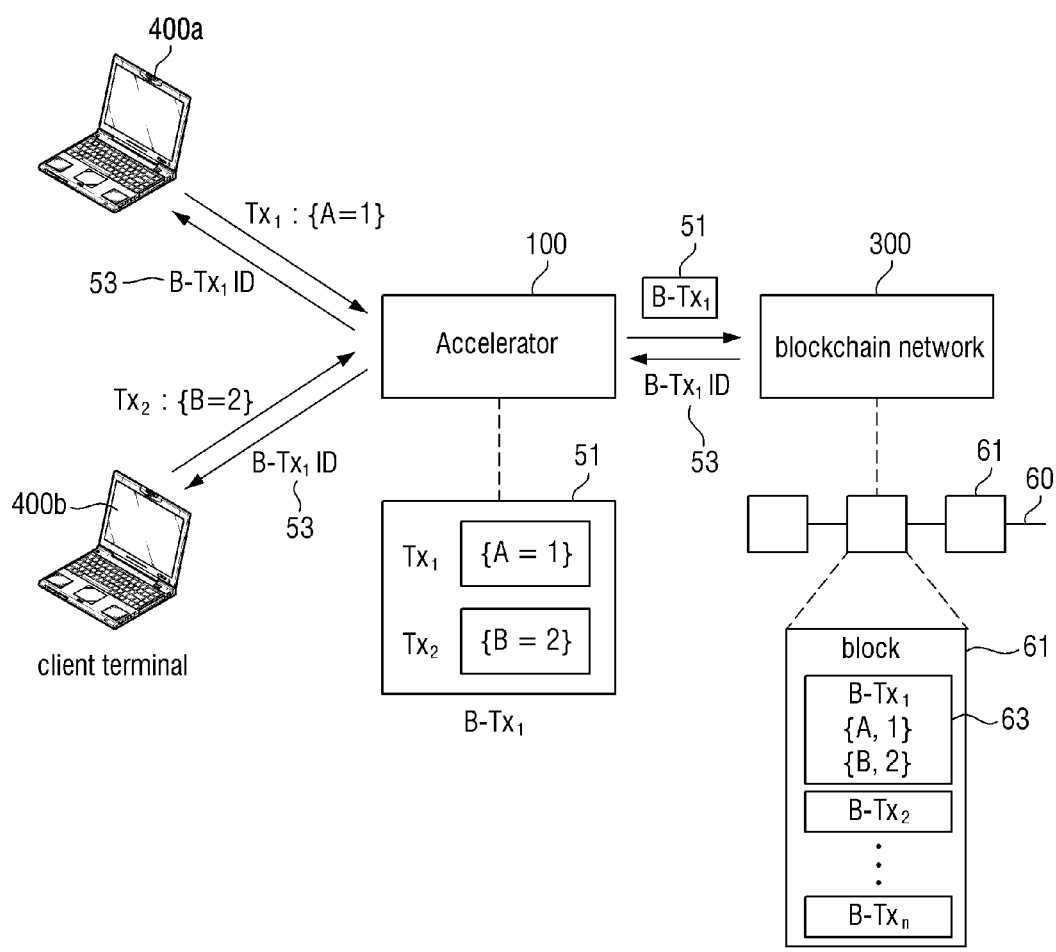
FIGS. 7 and 8 are exemplary diagrams illustrating a query related problem that may occur due to the batch processing.

Hereinafter, for convenience of understanding, a process for processing a write type transaction via the accelerator 100 will be described with reference to FIGS. 5 and 6. FIGS. 5 to 7 show an example in which the batch size is "3."

FIG. 5 illustrates a process in which a write type transaction is processed in accordance with some embodiments of the present disclosure.

As shown in FIG. 5, the accelerator 100 may generate a batch transaction 30 by aggregating a plurality of write type transactions $Tx_{w1}$, $Tx_{w2}$, and $Tx_{w3}$ (①and ②). In detail, depending on a classification result for the classifier 110, the batch generator 130 may insert the write type transactions $Tx_{w1}$, $Tx_{w2}$, and $Tx_{w3}$ into the same batch queue, and generate the batch transaction 30 in response to determining that the number of the write type transactions $Tx_{w1}$, $Tx_{w2}$, and $Tx_{w3}$ inserted in the batch queue satisfies the batch size.

Next, the accelerator 100 may request the blockchain network 300 to process the batch transaction 30 (③). Then, the blockchain nodes 200a and 200b constituting the blockchain network 300 may perform the consensus process for the batch transaction 30 and record an execution result for the batch transaction 30 on ledgers 230a and 230b.

As shown in FIG. 5, each blockchain node 230a and 230b may include processing modules 210a and 210b for processing the batch transaction 30. The processing modules 210a and 210b may use a smart contract to divide the execution result for the batch transaction 30 by transactions (or by status records), and update the ledger (e.g., a status DB) based on the divided execution results. Here, the execution result for the batch transaction 30 may include a signature of a blockchain node, an identifier of an individual transaction, identification keys A, B, and C and values 1, 2, and 3 of status record, or the like. Accordingly, the processing module 210a or 210b may divide the execution result for the batch transaction 30 by transaction (or by statuses) using the identification keys A, B, and C and/or the identifier of the transaction.

Next, the accelerator 100 may receive the processing result for the batch transaction 30 from the blockchain network 300 and provide the received processing result to the corresponding client terminal 400 (⑤ and ⑥).

Here, when the processing result indicates a failure, the handler 150 of the accelerator 100 may retry the processing for the batch transaction 30.

FIG. 6 illustrates a process in which a write type batch transaction is processed in a blockchain-based computing system in which a separate consensus node exists such as Hyperledger Fabric.

As shown in FIG. 6, the accelerator 100 may generate a batch transaction 40 and transmit the generated batch transaction 40 to a blockchain node 201 (②and ③). In addition, the accelerator 100 may receive an execution result for the batch transaction 40 from the blockchain node 201 (④-1). As described above, the execution result may include a signature of the blockchain node 201 for the batch transaction 40, the identification keys A, B, and C and values 1, 2, and 3 of the status record, or the like.

Next, the accelerator 100 may submit the received execution result to a separate consensus node 205 (④-2). Then, the consensus node 205 may verify the batch transaction 40 based on the execution result for the blockchain node 201, record the execution result to a new block, and propagate the new block onto the blockchain network 300 (④-3 and ④-4). Finally, each blockchain node 201 and 203 receiving the new block may divide the execution result for the batch transaction 40 by transactions (or by status records) via a processing module 211, and update a ledger based on the divided execution result (④-5).

As described with reference to FIGS. 5 and 6, when the transaction is processed via the accelerator 100, a plurality of transactions may be batch processed via the batch processing. In other words, the consensus process is not performed on an individual transaction basis, but a plurality of transactions may be batch processed by performing the consensus process on a batch transaction basis. Therefore, the performance of processing a transaction may be dramatically improved. In an ideal environment, the performance of processing the transaction would be improved in proportion to a batch size. Particularly, the batch processing described above is performed by the separate accelerator 100 and therefore does not require modification of an internal logic of a blockchain network (or platform). Therefore, the technical teaching described above may provide excellent portability and may be widely used in various blockchain networks (or platforms).

So far, the configuration and batch processing functions of the accelerator 100 according to some embodiments of the present disclosure have been described with reference to FIGS. 5 and 6. As described above, the performance of the system may be greatly improved when the batch processing is performed. However, due to the batch processing, a problem may occur when performing a query with a transaction identifier. Hereinafter, a problem for a query due to the batch processing and the technical teaching of the present disclosure to solve the problem for the query will be described in detail.

Figure 8:
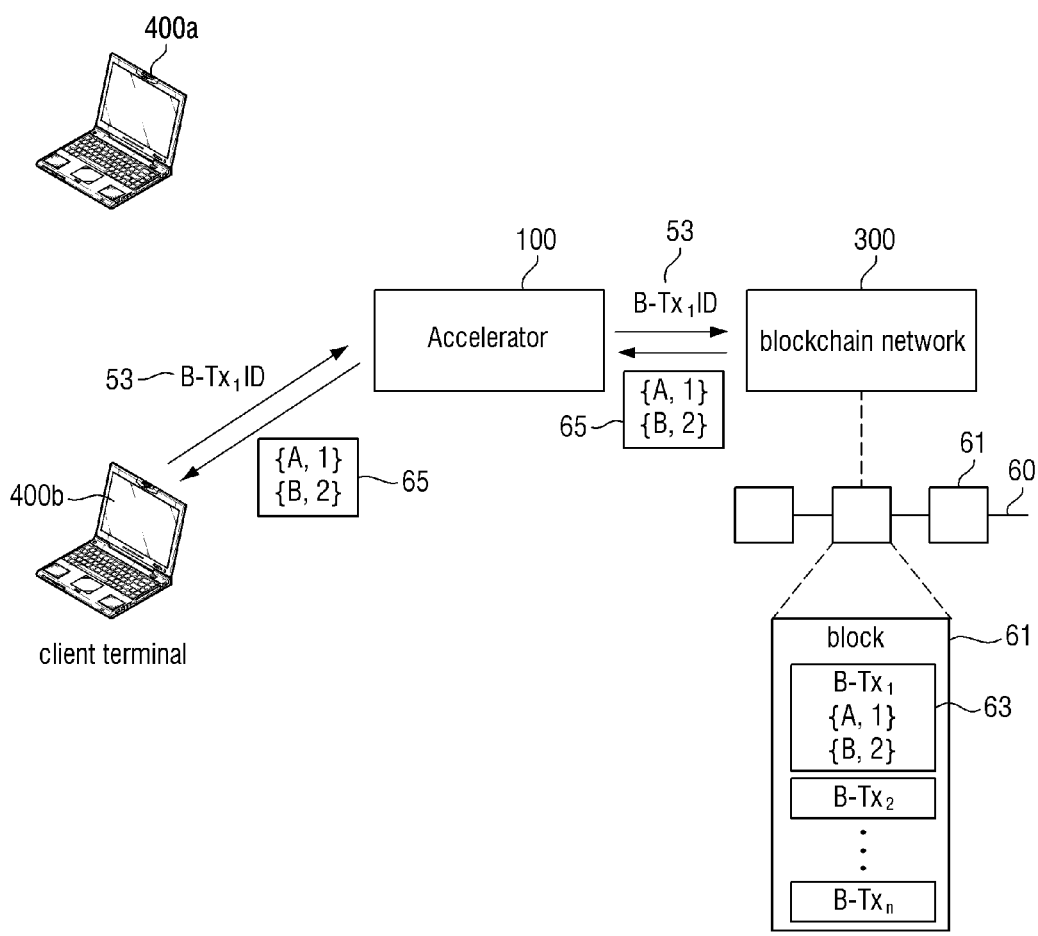

FIGS. 7 and 8 are exemplary diagrams illustrating a query related problem that may occur due to the batch processing. FIG. 7 illustrates that a plurality of individual transactions Tx₁ and Tx₂ requested by the client terminals 400a and 400b are processed by a batch transaction 51 via the accelerator 100.

As shown in FIG. 7, once the batch transaction 51 has completed processing, a status record 63 associated with the batch transaction 51 may be recorded in a particular block 61 of a blockchain 60. Naturally, in addition to the status record 63, various transaction data may be recorded together in the particular block 61. However, for clarity of the specification, the focus will be on the status record 63 to continue the description.

The status record 63 associated with the batch transaction 51 may refer to status data (i.e., a set of status keys and values) in which a processing result (or execution result) of a batch transaction is reflected. Hereinafter, for convenience of description, the status record 63 associated with the batch transaction 51 will be abbreviated as a "batch record 63" and a status record associated with an individual transaction will be abbreviated as an "individual record." Subsequently, the description will be continued with reference to FIG. 7.

In response to the processing, an identifier 53 of the batch transaction 51 may be provided to the client terminals 400a and 400b rather than identifiers of the individual transactions Tx₁ and Tx₂.

In such a case, the query related problem may occur when the client terminal 400a or 400b requests a query with the identifier 53 of the batch transaction 51. For example, assume that the client terminal 400b has requested a query with the identifier 53 of the batch transaction 51, as shown in FIG. 8. Then, the blockchain network 300 provide a batch record 65 as a query result, and the client terminal 400b is provided with a query result which also includes a status record (e.g., {A, 1}) irrelevant to the individual transaction Tx₂ requested by the client terminal 400b itself. In other word, a problem arises that a transaction identifier cannot accurately query a status record recorded in a blockchain. Hereinafter, various embodiments of the present disclosure for solving the problem will be described.

Each step of the methods according to various embodiments of the present disclosure, which will be described below, may be performed by a computing device. In other words, each step of the methods may be implemented with one or more instructions executed by a processor of a computing device. For the convenience of understanding, the description will be continued on the assumption that the methods are performed by the blockchain-based computing system illustrated in FIG. 1. For example, first steps of the methods may be performed by the accelerator 100 and second steps may be performed by the blockchain network 300. Alternatively, all steps of the methods may be performed by the accelerator 100. Hereinafter, it may be understood that when a subject of each operation is omitted in the description of this embodiment, it may be performed by the illustrated device (e.g., 100 and 300). In addition, the methods may change an order of performing each operation within a range in which an order of execution may be logically changed as necessary.

Hereinafter, a method for managing a transaction according to some embodiments of the present disclosure will be described with reference to FIGS. 9 to 12.

The method for managing the transaction may include a transaction processing process for processing a transaction based on batch processing and a query process for querying a status record. First, the transaction processing process will be described with reference to FIGS. 9 to 11, and then the query process will be described.

Figure 9:
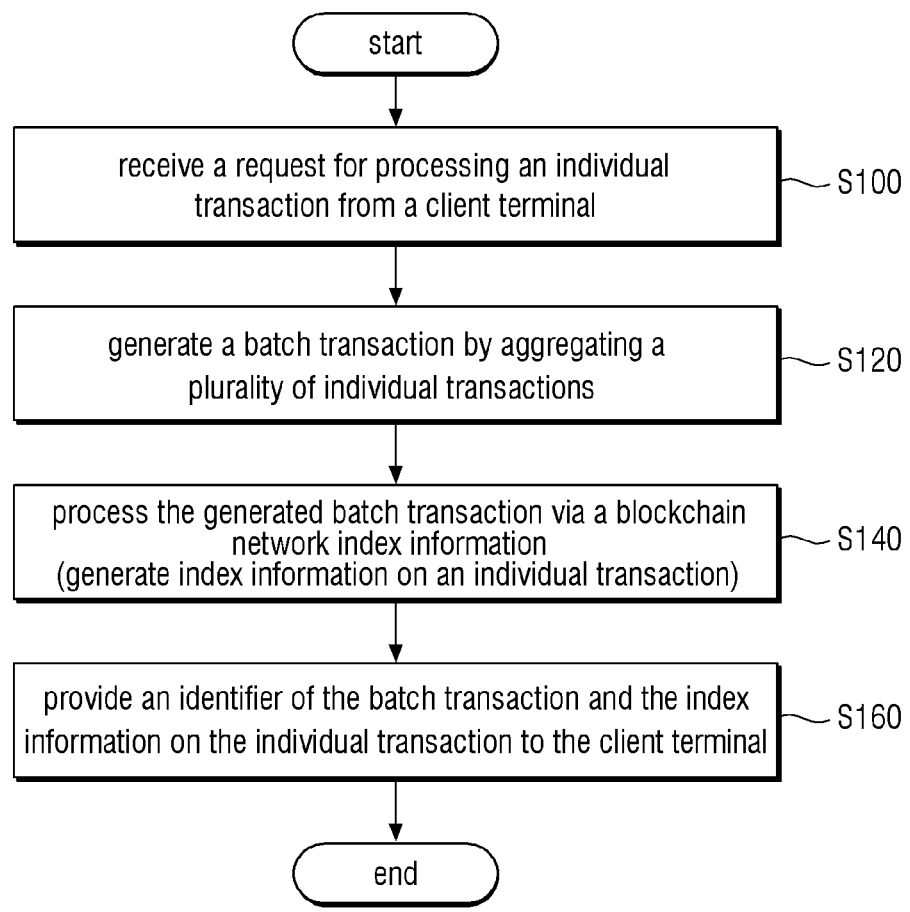
FIGS. 9 to 11 are diagrams illustrating a process for processing a transaction according to some embodiments of the present disclosure.

FIG. 9 is an exemplary flowchart illustrating a transaction processing process according to some embodiments of the present disclosure. However, this is only a preferred embodiment for achieving the object of the present disclosure. Naturally, some steps may be added or deleted as necessary.

As shown in FIG. 9, the transaction processing process may begin at step S100 of receiving a request for processing an individual transaction from the client terminal 400. For example, a request for processing a plurality of individual transactions may be received from one or more client terminals 400.

In step S120, a batch transaction is generated by aggregating the plurality of individual transactions. For details of the present step, refer to the description of FIGS. 4 to 6.

In step S140, the batch transaction is processed via the blockchain network 300. In the process, index information on an individual transaction may be generated, and the index information may be determined based on a location where the individual record exists in a batch record recorded in a blockchain. For example, the index information on a first individual transaction may indicate where a first status record for the first individual transaction is located in a batch record. A method for determining and generating the index information will be described later with reference to FIGS. 10 and 11.

In step S160, an identifier of the batch transaction and index information on the requested individual transaction are provided to the corresponding client terminal 400. The identifier of the batch transaction and the index information may be used by the client terminal 400 to query its individual record, which will be described later with reference to FIG. 12.

Figure 10:
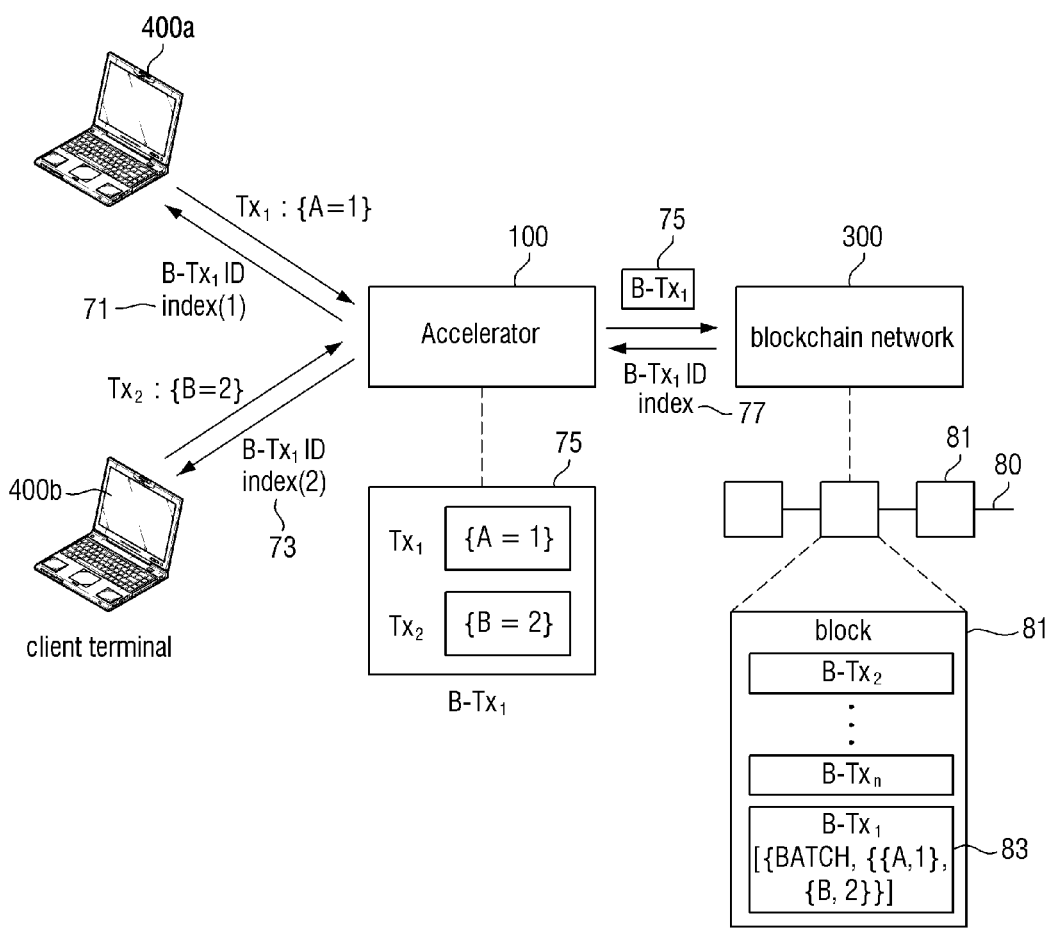

For convenience of understanding, the method for managing the transaction described above will be further described with reference to an example illustrated in FIG. 10. FIG. 10 illustrates that two individual transactions $Tx_1$ and $Tx_2$ requested by the client terminals 400a and 400b are processed by a batch transaction 75 via the accelerator 100.

As shown in FIG. 10, a batch record for the batch transaction 75 will include a first individual record for a first individual transaction $Tx_1$ and a second individual record for a second individual transaction $Tx_2$.

Figure 11:
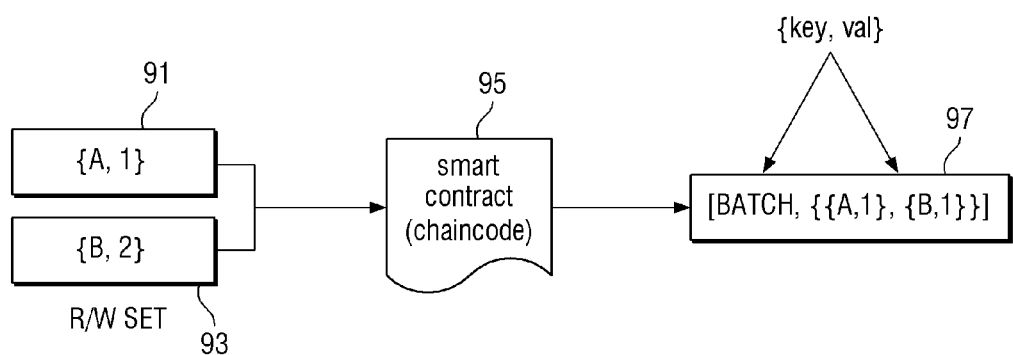

In such a case, the first individual record and the second individual record are aggregated into one batch record 83, and index information may be determined in the aggregation process. For example, as shown in FIG. 11, the first individual record 91 and the second individual record 93 may be aggregated into a batch record 97 by a smart contract 95 uploaded to the blockchain network 300. Specifically, each status record 91, 93, and 97 may be composed of a key field and a value field, in which the first individual record 91 and the second individual record 93 may be inserted in the form of a list in the value field of the batch record 97. In addition, index information on an individual transaction may be determined based on a location where each individual record is inserted in the value field of the batch record 97. For example, index information on the first individual transaction $Tx_1$ may be determined as "1," and index information on the second individual transaction $Tx_2$ may be determined as "2."

In addition, certain additional information (e.g., BATCH) may be inserted into the key field of the batch record 97 to indicate that the batch record 97 is associated with a batch transaction. The additional information may determine which status record is associated with the batch transaction.

The smart contract 95 may be called by the accelerator 100 and executed on the blockchain network 300. However, it may be implemented in other ways, and thus, the technical scope of the present disclosure is not limited thereto.

For reference, a status record associated with a transaction (e.g., 91, 93, or the like of FIG. 11) may correspond to a read/write set in Hyperledger Fabric, and a smart contract may be named as a chaincode in the art.

It will be described with reference to FIG. 10 again.

After the batch record 83 generated via aggregating is recorded to a particular block 81 of a blockchain 80, the blockchain network 300 may provide the accelerator 100 with an identifier (e.g., B-$Tx_1$ ID) of the batch transaction and index information 77 on the individual transaction. In addition, the accelerator 100 may provide the client terminal 400a or 400b with the identifier (e.g., B-$Tx_1$ ID) of the batch transaction and the index information 77 on the requested individual transaction. For example, index information 71 (e.g., 1) on the first individual transaction $Tx_1$ may be provided to the first client terminal 400a, and index information 73 (e.g., 2) on the second individual transaction $Tx_2$ is provided to the second client terminal 400b may be provided.

The client terminals 400a and 400b may accurately query for an individual record to be queried using the identifier of the batch transaction and the index information 71 and 73 on the individual transactions $Tx_1$ and $Tx_2$. Hereinafter, the query process will be described with reference to FIG. 12.

Figure 12:
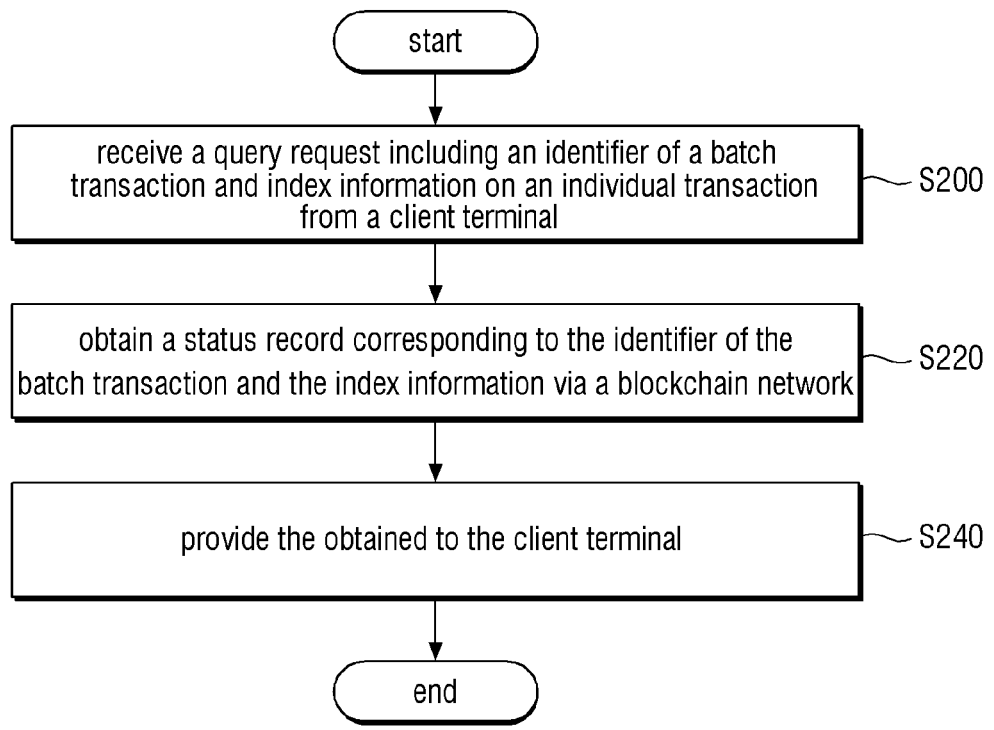
FIG. 12 is an exemplary flowchart illustrating a query process according to some embodiments of the present disclosure.

FIG. 12 is an exemplary flowchart illustrating a query process according to some embodiments of the present disclosure. However, this is only a preferred embodiment for achieving the object of the present disclosure. Naturally, some steps may be added or deleted as necessary.

As shown in FIG. 12, the query process may be started in step S200 of receiving a query request from the client terminal 400. For example, the accelerator 100 may receive a query request including an identifier of a batch transaction and index information on an individual transaction from the client terminal 400.

In step S220, a blockchain is queried to obtain a status record (i.e., an individual record) corresponding to the identifier and the index information. For example, when the accelerator 100 forwards the query request to the blockchain network 300, the blockchain network 300 may query the blockchain with the identifier to determine a batch record matching the identifier. In addition, the accelerator 100 may extract an individual record corresponding to the index information from a value field of the batch record and provide it to the accelerator 100. In another example, the accelerator 100 may extract the individual record corresponding to the index information from the value field of the batch record.

In step S240, the individual record corresponding to the index information may be provided to the client terminal 400. For example, the accelerator 100 may provide the individual record to the client terminal 400.

So far, the method for managing the transaction according to some embodiments of the present disclosure has been described with reference to FIGS. 9 to 12. According to the description above, the problem that the individual record could not be queried correctly due to the batch processing may be solved, so that the convenience of a query function may be improved.

Meanwhile, in some other embodiments of the present disclosure, a batch record may be recorded in a blockchain in a compressed form for the storage efficiency of the blockchain. In such a case, a compressed batch record may be obtained by querying a blockchain with an identifier of a batch transaction, and an individual record corresponding to index information may be determined by decompressing. In addition, the individual record may be provided as a query result.

In addition, according to some other embodiments of the present disclosure, an individual record of each individual transaction included in a batch transaction may additionally be stored in a status DB. Here, a new status key may be assigned to each individual record stored in the status DB. For convenience of understanding, this embodiment will be described further with reference to the example shown in FIG. 13.

Figure 13:
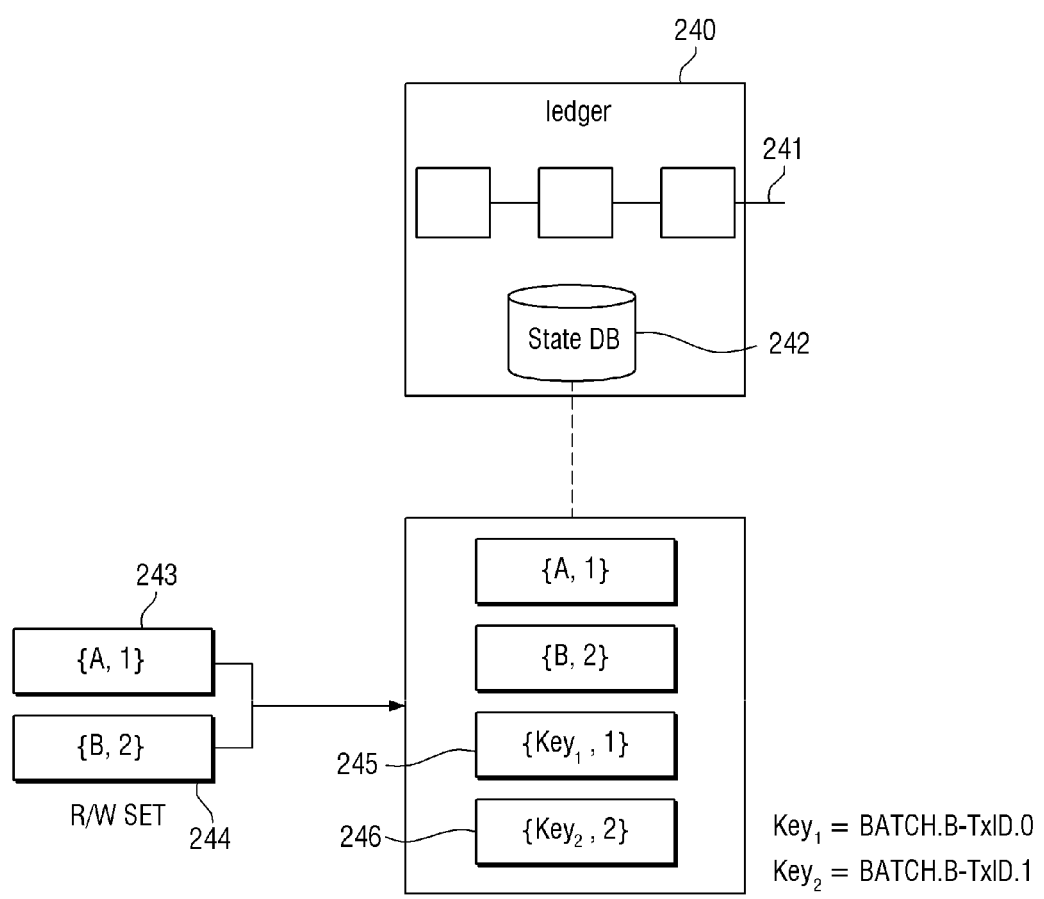
FIG. 13 is an exemplary diagram illustrating a process for storing a status record according to some embodiments of the present disclosure.

FIG. 13 illustrates two individual records 243 and 244 stored in a status DB 242 in accordance with some embodiments of the present disclosure.

As shown in FIG. 13, a ledger 240 may include a separate status DB 242 in addition to a blockchain 241. To store status records, the status DB 242 may be implemented as a DB with a key and value format.

In this embodiment, the individual records 243 and 244 are stored in the status DB 242 as they are in order to provide a query function for status keys (e.g., A and B). In addition, additional individual records 245 and 246 may be further stored in status DB 242 to further provide a query function for batch transaction identifiers. Moreover, new status keys (e.g., $Key_1$ and $Key_2$) may be generated and assigned to the additional individual records (245 and 246).

The specific way of generating the new status keys (e.g., $Key_1$ and $Key_2$) may vary depending on embodiments.

In some embodiments, status keys of the additional individual records 245 and 246 may be generated based on the combination of the identifier of the batch transaction and the index information on the individual transaction. For example, a status key of a first additional individual record 245 may be generated as "B-TxID.0" by the combination of an identifier (e.g., B-TxID) and index information (e.g., 0) of a batch transaction. Here, the index information may refer to a location where an individual record is inserted in a batch record, may refer to a location in the status DB 242, and may be defined and designed in various ways. Therefore, the technical scope of the present disclosure is not limited by the manner of designating the index information.

In some other embodiments, as shown in FIG. 13, additional information (e.g., BATCH) indicative of association with a batch transaction may be further combined to generate the status key of the additional individual records 245 and 246. For example, the status key of the first additional individual record 245 may be generated as "BATCH.B-TxID.0" by further combining the additional information (e.g., BATCH).

As shown in FIG. 13, when the additional individual records 245 and 246 are stored in the status DB 242, a query function for the individual records may be provided via the status DB 242. In other words, when the client terminal 400 is provided with the identifier of a batch transaction and the index information on the individual transaction as a result for processing the transaction, the client terminal 400 may query the individual record with the identifier and the index information.

For example, when a query request including an identifier of a batch transaction and index information on an individual transaction is received, a status record (e.g., 245, 246) corresponding to the identifier of the batch transaction and the index information may be obtained from the status DB 242. The query for the status DB 242 may be performed by generating a status key in the manner described above and querying the status DB 242 with the generated status key.

Meanwhile, according to some other embodiments of the present disclosure, each record of individual transactions included in a batch transaction may be stored in a separate DB (e.g., RDB) instead of the status DB. For example, each individual record may be stored in match with an identifier of a batch transaction and index information on an individual transaction. In this case, a query function for an individual record may be provided via the separate DB. For example, when a query request including an identifier of a batch transaction and index information on an individual transaction is received from the client terminal 400, it queries and provide an individual record corresponding to the identifier of the batch transaction and the index information via the separate DB thereby enabling to provide the query function for the individual record.

Hereinafter, a method for managing a transaction according to some embodiments of the present disclosure will be described with reference to FIGS. 14 to 16. In the following description, for the sake of clarity, the description of overlapping contents with the foregoing embodiments will be omitted.

In this embodiment, a query function for an individual record may be provided by using a transaction code obtained from the client terminal 400 without using index information for an individual transaction. The transaction code may be understood as a kind of secret code managed by a client side. The method for managing the transaction may also include a transaction processing process and a query process. Hereinafter, each process will be described.

Figure 14:
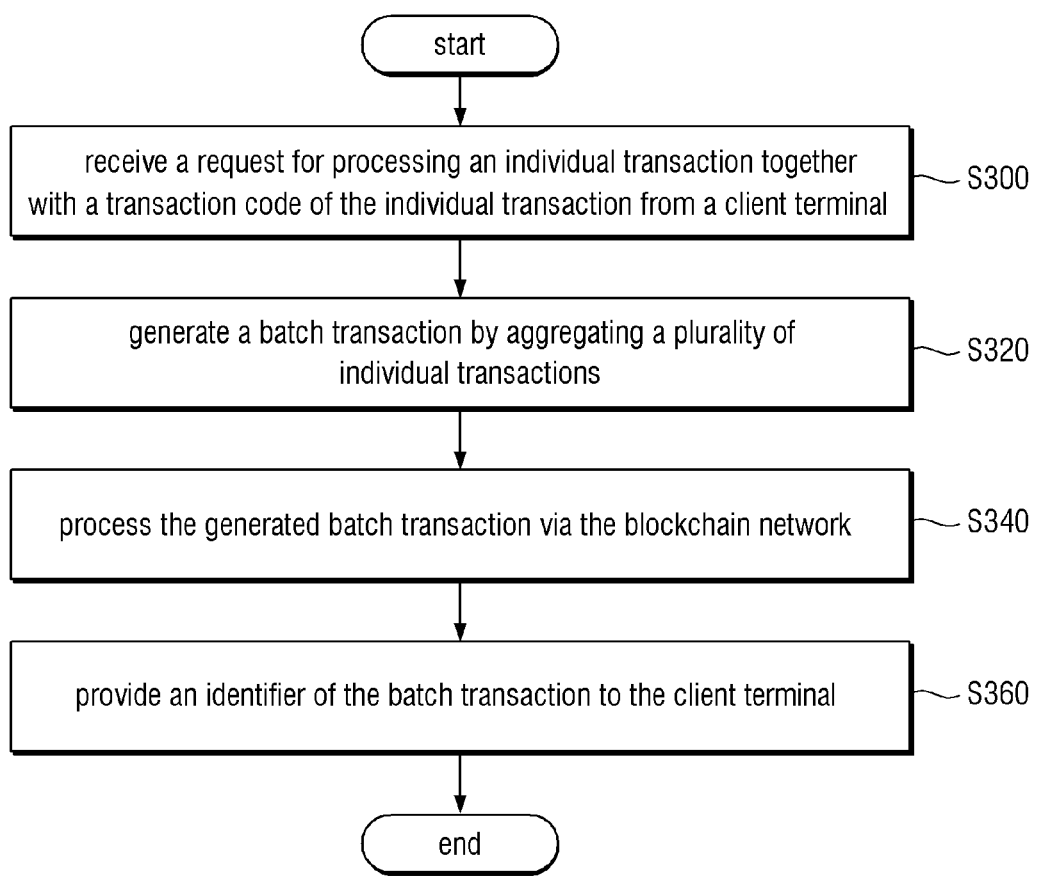
FIGS. 14 and 15 are diagrams illustrating a process for processing a transaction according to some other embodiments of the present disclosure.

FIG. 14 is an exemplary flowchart illustrating a transaction processing process according to some embodiments of the present disclosure. However, this is only a preferred embodiment for achieving the object of the present disclosure. Naturally, some steps may be added or deleted as necessary.

As shown in FIG. 14, the transaction processing process may be started in step S300 of receiving a request for processing the individual transaction together with a transaction code of the individual transaction from the client terminal 400.

In step S320, a batch transaction is generated by aggregating a plurality of individual transactions.

In step S340, the batch transaction is processed via the blockchain network 300, and a batch record which is a processing result for the batch transaction is recorded in a blockchain. In this step, when the batch record is recorded in the blockchain, each individual record included in the batch record may be encrypted by the transaction code. For convenience of understanding, the following description will be further provided with reference to the example shown in FIG. 15.

Figure 15:
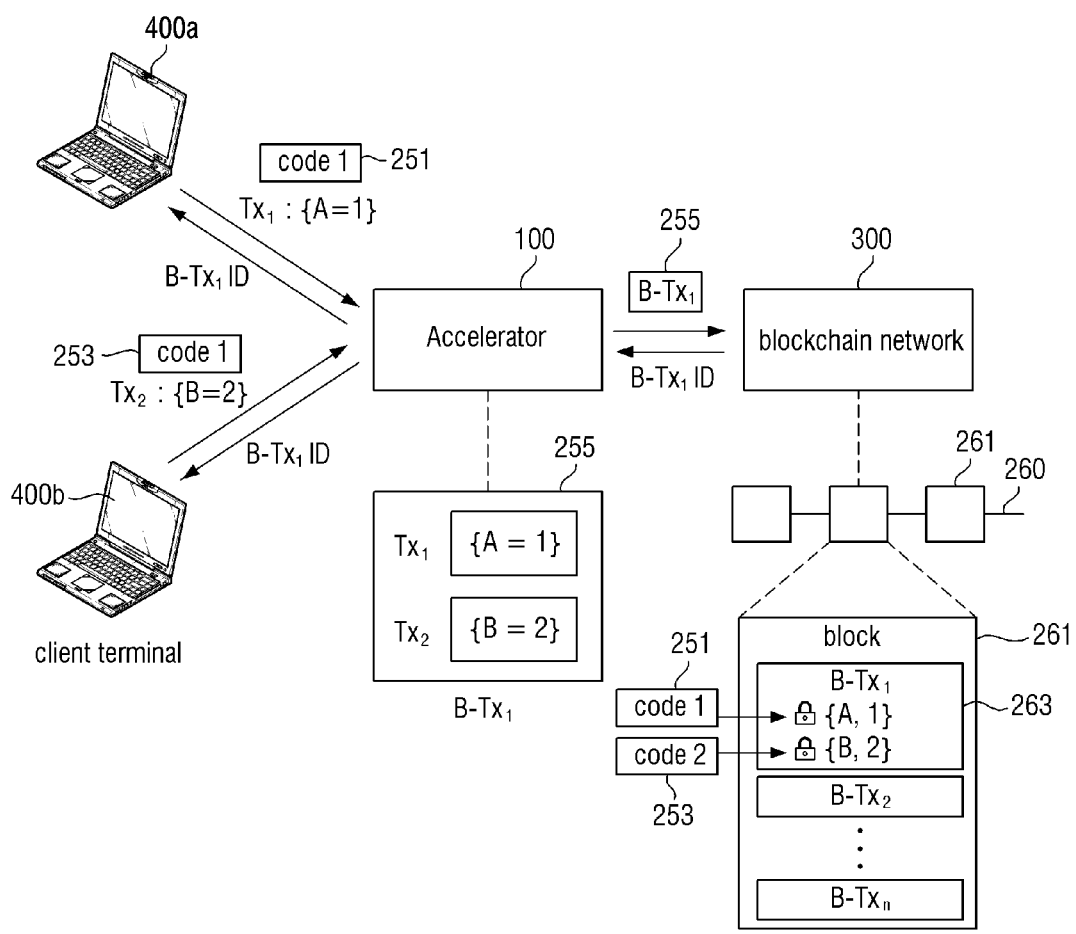

As shown in FIG. 15, when transaction codes 251 and 253 are received from each of the client terminals 400a and 400b, among a batch records 263 associated with a batch transaction 255, an individual record (e.g., {A, 1}) associated with a first individual transaction $Tx_1$ is encrypted by a first transaction code 251, and a second individual record (e.g., {B, 2}) associated with a second individual transaction $Tx_2$ may be encrypted by a second transaction code 253. The encrypted status record 263 may be recorded in a particular block 261 of a blockchain 260.

The encryption may be performed in any manner as long as decoding is possible, and may include any transformation scheme (e.g., encoding, coding, or the like) that changes original data. The encryption may be executed by a smart contract, but the technical scope of the present disclosure is not limited thereto.

In some embodiments of the present disclosure, the transaction code may not be stored in the blockchain network 300 or the accelerator 100. In other words, after encrypting each individual record with the transaction code, the transaction code may be discarded. Therefore, the security of a status record may be greatly improved.

It will be described with reference to FIG. 14 again.

In step S360, the client terminal 400 is provided with an identifier of a batch transaction. Then, the client terminal 400 may query an individual record using the identifier and its transaction code. Hereinafter, the query process will be described with reference to FIG. 16.

Figure 16:
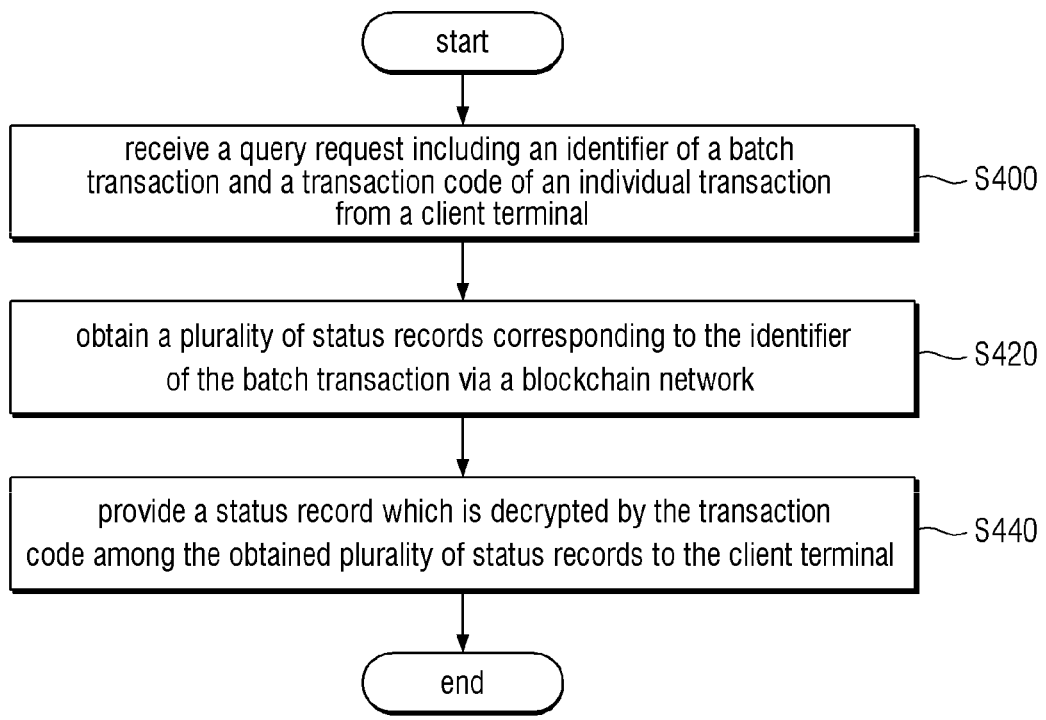
FIG. 16 is an exemplary flowchart illustrating a query process according to some other embodiments of the present disclosure.

FIG. 16 is an exemplary flowchart illustrating a query process according to some other embodiments of the present disclosure. However, this is only a preferred embodiment for achieving the object of the present disclosure. Naturally, some steps may be added or deleted as necessary.

As shown in FIG. 16, in step S400, the query process starts with step S400 of receiving a query request including an identifier of a batch transaction and a transaction code of an individual transaction from the client terminal 400. For example, the accelerator 100 may receive the query request.

In step S420, a batch record corresponding to the identifier of the batch transaction is obtained via the blockchain network 300. The batch record may be obtained by querying the blockchain by the identifier. The batch record may include a plurality of individual records encrypted with different transaction codes.

In step S440, a status record decrypted by the transaction code of step S400 among the plurality of status records is provided to the client terminal 400 as a query result. The determination as to whether or not to be decrypted may be performed in any way. In addition, the determination may be performed by a smart contract or may be performed by the accelerator 100.

On the other hand, in some other embodiments, the query may be performed using only an identifier of a batch transaction. For example, the accelerator 100 may receive a query request including only an identifier of a batch transaction from the client terminal 400. Then, the accelerator 100 may provide a batch record queried by the identifier to the client terminal 400 in cooperation with the blockchain network 300. In this embodiment, the client terminal 400 may directly determine an individual record to be decrypted by its transaction code among a plurality of individual records included in the batch record. In other words, the determination as to whether or not to be decrypted may be performed by the client terminal 400.

So far, the method for managing the transaction according to some embodiments of the present disclosure has been described with reference to FIGS. 14 to 16. According to the method as described above, a query function for an individual record may be provided using a transaction code, and the security of a status record may be greatly improved via an encryption process.

Hereinafter, an exemplary computing device 500 that may implement an apparatus/system (e.g., accelerator 100) according to various embodiments of the present disclosure will be described with reference to FIG. 17.

FIG. 17 is a hardware diagram illustrating a computing device 500.

As shown in FIG. 17, the computing device 500 may include a one or more processors 510, a bus 550, a communication interface 570, a memory 530 to load a computer program 591 executed by the processor 510, and a storage 590 to store the computer program 591. However, FIG. 17 only illustrates components related to an embodiment of the present disclosure. Therefore, it may be understood by those skilled in the art that the present disclosure may further include other general purpose components in addition to the components illustrated in FIG. 17.

The processor 510 controls the overall operation of each component of the computing device 500. The processor 510 may be configured to include a central processing unit (CPU), a microprocessor unit (MPU), a micro controller unit (MCU), a graphics processing unit (GPU), or any type of processor well known in the art. In addition, the processor 510 may perform an operation on at least one application or program for executing a method/operation according to various embodiments of the present disclosure. The computing device 500 may have one or more processors.

The memory 530 stores various data, commands, and/or information. The memory 530 may load one or more programs 591 from the storage 590 to execute methods/operations according to various embodiments of the present disclosure. For example, when the computer program 591 is loaded into the memory 530, a logic (or a module) as shown in FIG. 4 may be implemented on the memory 530. An example of the memory 530 may be a RAM, but it is not limited thereto.

The bus 550 provides communication between components of the computing device 500. The bus 550 may be implemented as various types of buses such as an address bus, a data bus, a control bus, or the like.

The communication interface 570 supports wired and wireless Internet communication of the computing device 500. The communication interface 570 may also support various communication manners other than Internet communication. To this end, the communication interface 570 may be configured to include a communication module well known in the art.

The storage 590 may non-temporarily store the one or more computer programs 591. The storage 590 may be configured to include a non-volatile memory such as a read only memory (ROM), an erasable programmable ROM (EPROM), an electrically erasable programmable ROM (EEPROM), or a flash memory, a hard disk, a removable disk, or any form of computer readable recording medium well known in the art to which the present disclosure belongs.

The computer program 591 may include one or more instructions on which methods/operations according to various embodiments of the present disclosure are implemented. Once the computer program 591 is loaded into the memory 530, the processor 510 may the perform methods/operations according to various embodiments of the present disclosure by executing the one or more instructions.

For example, the computer program 591 may include instructions to perform operations of receiving a request for processing a first individual transaction from the client terminal 400, generating a batch transaction by aggregating a plurality of individual transactions including the first individual transaction, processing the generated batch transaction via the blockchain network 300 such that a status record associated with the batch transaction is recorded in a blockchain, and providing an identifier of the batch transaction and index information on the first individual transaction to the client terminal 400. In such a case, the accelerator 100 or the blockchain-based computing system in accordance with some embodiments of the present disclosure may be implemented via the computing device 500.

As another example the computer program 591 may include instructions to perform operations of receiving a request for processing a first individual transaction together with a transaction code for the first individual transaction from the client terminal 400, generating a batch transaction by aggregating a plurality of individual transactions including the first individual transaction, processing the generated batch transaction via the blockchain network 300 to record a plurality of status records associated with the batch transaction in a blockchain, and providing an identifier of the batch transaction to the client terminal 400. In such a case, the accelerator 100 or the blockchain-based computing system in accordance with some other embodiments of the present disclosure may be implemented via the computing device 500.

The concepts of the invention described above can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method for managing a transaction, the method being performed in a blockchain-based computing system, the method comprising:
   receiving a request for processing a first individual transaction from a client terminal;
   generating, by an accelerator computing device connecting the client terminal to a blockchain network that manages a blockchain and a status database, a batch transaction by aggregating a plurality of individual transactions including the first individual transaction and a second individual transaction;
   processing the generated batch transaction via the blockchain network, such that a status record generated by processing the batch transaction is recorded in the blockchain; and
   providing the client terminal with an identifier of the batch transaction and index information on the first individual transaction,
   wherein the status record is generated by aggregating a first individual record associated with the first individual transaction and a second individual record associated with the second individual transaction,
   wherein the aggregating is performed by a smart contract of the blockchain network,
   wherein the status record includes:
      a key field in which information indicating association with the batch transaction is located; and
      a value field in which the first individual record and the second individual record located,
   wherein the index information on the first individual transaction is determined based on a location of the first individual record within the status record,
   wherein the blockchain provides a lookup function for the status record based on the identifier of the batch transaction via the blockchain network,
   wherein a third individual record associated with the batch transaction is further stored in the status database that provides a lookup function based on a key-based query via the blockchain network, and
   wherein the third individual record includes a status key derived from a combination of the identifier of the batch transaction and the index information and a status value associated with the first individual record.

2. The method of claim 1,
   wherein the index information on the first individual transaction is determined in the aggregation process.

3. The method of claim 1, wherein the status record is recorded in the blockchain in a compressed form.

4. The method of claim 1, further comprises:
   receiving a query request including the identifier of the batch transaction and the index information on the first individual transaction from the client terminal;
   obtaining the status record corresponding to the identifier of the batch transaction via the blockchain network;
   extracting the first individual record corresponding to the index information from the value field of the status record; and
   providing, in response to the query request, the first individual record to the client terminal.

5. The method of claim 1, further comprising:
   storing the first individual record and the second individual record in the status database.

6. The method of claim 1, further comprising storing a fourth individual record in the status database,
   wherein the fourth individual record includes a status key derived from a combination of the identifier of the batch transaction and the index information and a status value associated with the second individual record.

7. The method of claim 1, further comprises:
   receiving a query request including the identifier of the batch transaction and the index information on the first individual transaction from the client terminal;
   obtaining the third individual record corresponding to the identifier of the batch transaction and the index information from the status data base; and
   providing, in response to the query request, the third individual record.

8. The method of claim 1, wherein the status record is further stored in a separate database (DB) along with the identifier of the batch transaction and the index information on the first individual transaction,
   the method further comprises:
   receiving a query request including the identifier of the batch transaction and the index information on the first individual transaction from the client terminal;
   obtaining a status record corresponding to the identifier of the batch transaction and the index information from the DB; and
   providing, in response to the query request, the obtained status record.

9. The method of claim 1, wherein the generating the batch transaction comprises:
   classifying the plurality of individual transactions according to predetermined classification criteria;
   inserting the classified individual transactions into a batch queue corresponding to a classification result; and generating, in response to determining that the number of individual transactions in a particular batch queue satisfies a predetermined batch size, the batch transaction by aggregating the individual transactions in the particular batch queue.

10. The method of claim 9, wherein the classification criteria include at least one of an identifier of a smart contract associated with an individual transaction, a channel identifier associated with an individual transaction, and a type of an individual transaction.

11. The method of claim 9, wherein the generating the batch transaction by aggregating the individual transactions in the particular batch queue comprises:
generating the batch transaction in response to an expiration event of a batch timer even if the number of individual transactions in the particular batch queue does not satisfy the predetermined batch size.

* * * * *